(12) United States Patent
Bouamra

(10) Patent No.: US 6,243,167 B1
(45) Date of Patent: Jun. 5, 2001

(54) MULTIMODE FIBER OPTIC GYROSCOPE

(75) Inventor: Mohamed Bouamra, Strasbourg (FR)

(73) Assignee: Talltec Technologies Holdings S.A., Luxembourg ( * ) Notice: Subject to any disclaimer, the term of this patent is extended or adjusted under 35 U.S.C. 154(b) by 0 days.

(21) Appl. No.: 09/297,872

(22) PCT Filed: Nov. 14, 1997

(86) PCT No.: PCT/FR97/02057

§ 371 Date: Jul. 1, 1999

§ 102(e) Date: Jul. 1, 1999

(87) PCT Pub. No.: WO98/21551

PCT Pub. Date: May 22, 1998

(30) Foreign Application Priority Data

Nov. 14, 1996 (FR) .................................................. 96 14048

(51) Int. Cl.[7] .................................................. G01C 19/72
(52) U.S. Cl. .................................................. 356/460; 356/462
(58) Field of Search .................................................. 356/350, 460, 356/462, 463, 464

(56) References Cited

U.S. PATENT DOCUMENTS 4,634,282 * 1/1987 Shaw et al. ........................... 356/350
4,828,389 * 5/1989 Gubbins et al. ...................... 356/350
5,048,961 * 9/1991 Okamoto .............................. 356/350

FOREIGN PATENT DOCUMENTS

| 2680570 | 2/1993 | (FR) . |
| 2725784 | 4/1996 | (FR) . |
| 83/01683 | 5/1983 | (WO) . |

* cited by examiner

*Primary Examiner*—Samuel A. Turner
(74) *Attorney, Agent, or Firm*—Davis & Bujold, P.L.L.C.

(57) ABSTRACT

The invention concerns an optical fiber gyrometer with high stability of scaling factor comprising a light source (2) supplying the two ends of a ring-shaped guide (1) and a sensor (6) receiving the two modal distributions which have traveled along the guide (1) in mutually inverse directions, the values $V_{dc}$, $V_1$, and $V_2$ representing the continuous components respectively incoherent, of the fundamental and of the order 1 harmonic, of the optical signal are used for establishing a quotient independent of the fluctuations of the components of the gyrometer and representing the scaling factor. These values are derived for the first detection and for the two others from the synchronous demodulation of the optical signal. The invention is useful for users and manufacturers of gyrometers.

29 Claims, 6 Drawing Sheets

MULTIMODE FIBER OPTIC GYROSCOPE

The invention concerns a multimode optical fiber gyroscope, single or multi-axial, with improved resolution and stability.

The improvement essentially relates to diagonal stability and the scaling factor.

Ring-shaped gyroscopes with multimode optical fibers are known in the art. However, the prior art solutions do not present practical solutions for industry, nor do they achieve the objectives of the present invention or respond to industrial needs.

These prior art solutions depend upon the SAGNAC effect and often upon the physical principle of reciprocity, according to which an extrinsic disturbance produces the same phase effects on both counter-rotating waves propagating within a ring guide. These considerations make it necessary for the system's inlet/outlet device to be equipped with a reciprocal dual coupling, which increases manufacturing costs and has a negative effect on output.

Furthermore, prior art devices often resort to particular methods of modulation and detection which are difficult to implement and impose very strict manufacturing limitations.

The essential advantage of the present invention consists in the use of a source, an optical fiber, and a detection circuit in an economical device, easily adapted to industry To achieve these objectives, the components which are selected must meet two essential criteria.

The first requirement is to obtain maximum dispersion between two adjacent modes, no matter what modes are being considered. This condition is fulfilled by making the appropriate selection first, of the source characteristics, that is, its spectral width and central wave length, and second, the parameters influencing the fiber's dispersion characteristics such as length, numerical aperture, index profile, and other opto-geometric characteristics of the fiber.

The preferred version of the invention has a source with a broad spectrum associated with a highly dispersive fiber.

The second criterion concerns the symmetry of modal distributions in both propagation directions.

The principal goal of the present invention is to furnish an output value proportionate to the speed known as rotation speed, that is, angular displacement, which is independent of the principal diverse fluctuations of the gyroscope components.

According to one variation, the invention furnishes data about the independent rotation speed of the various principal fluctuations in the gyroscope components. Until now, variations in the source wave length have remained difficult to quantify.

From that point, in a broad range of operating temperatures, it is no longer necessary to take multiple precautions to minimize variations in the source wave length.

Other advantages of the invention are enumerated below:
The use of multimode fiber with a large core diameter and
  large numerical aperture allows the use of a strongly
  divergent light source without affecting energy output at
  injection. A simple, inexpensive, light-emitting diode
  accomplishes this. The same holds true for other connection operations.
It is no longer necessary for the design of the gyroscope to
  incorporate two reciprocal input/output couplers. A single
  X coupler can be used, which decreases manufacturing
  costs and improves the power output of the sensor.
Since the light signal within the fiber is completely
  depolarized, it is no longer necessary, as with monomode
  fiber gyroscopes, to use polarizers, polarization controls,
  or depolarizing systems. In addition, the sensor becomes
  completely immune to magnetic fields (Faraday effect)
  and electrical fields (Kerr effect). It is no longer necessary
  to use expensive materials to block these effects. This
  reduces the number of components substantially and
  simplifies assembly.
The system's stability depends upon the optical properties of
  its components. This results from the possibility of
  assimilating the gyroscope with a large number of
  independent, elementary gyroscopes. Thus, it is no longer
  necessary to reset the gyroscope to zero before each use,
  and systems can be stored and put to immediate use as
  necessary.
The ability to manufacture a small size gyroscope is an
  important advantage in certain applications requiring
  mini-gyroscopes.
The signals chosen, that is, $0^{th}$, $1^{st}$ and $2^{nd}$ order harmonics
  in the mathematical formulas adopted, result in gyroscopes with a scaling factor which is independent of the
  principal fluctuations characterizing gyroscopes of this
  type.

Other features and advantages of the present invention will be apparent from the following description, given by way of example, of one preferred embodiment, with reference to the accompanying drawings, in which.

The primary goal of the invention is to eliminate the principal causes of instability, using units and circuits giving output values which, when mathematically associated, provide a representation of rotation speed, that is, the gyroscope's angular displacement. This value is independent of the variations originating from various fluctuations associated with the components of the gyroscope. According to one variation of the invention, the result is also independent of variations in the source wave length.

Furthermore, to ensure that the gyroscope functions adequately, appropriate selections must be made first, among source characteristics, that is, spectral width and central wave length, and also, among the parameters influencing fiber dispersion characteristics such as length, numerical aperture, index profile, etc.

In actuality, any intrinsic or extrinsic disturbance can cause two nearby co-propagating modes of any order to couple and produce interference, causing an unstable gyroscope response. To overcome this problem, the two modes must be totally independent in order to render any coupling of the modes as incoherent as possible.

This condition can be verified by selecting an intermodal dispersion fiber such that the difference in optical path is greatly superior to the coherence length of the light source. Since a fiber's intermodal dispersion depends upon its index profile, a fiber of high index with an index profile coefficient tending towards infinity easily fulfills this criterion when associated with a wide spectrum source.

Figure 1:
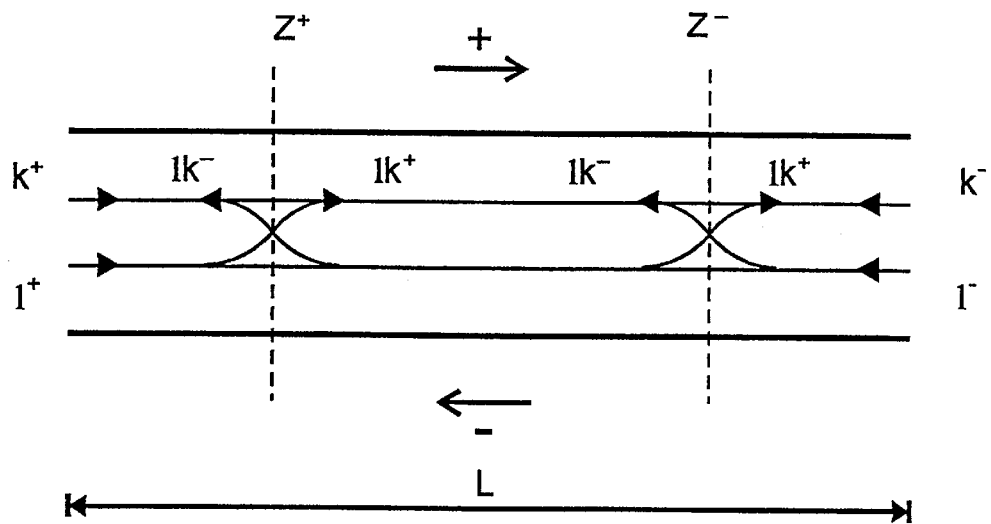
FIG. 1 represents the principle of the physical effect of mode propagation and coupling.

Besides eliminating the influence of fluctuations among the components on the outcome, the stability of the gyroscope according to the invention results from the physical effect of modal averaging and upon the principle to be described in conjunction with FIG. 1, which shows one section of optical fiber of arbitrary length L modeled like a system with M groups of independent modes with double inlets/outlets on which there are defined two opposite directions of mode propagation denoted as + and −, respectively.

Among the many independent modes that can be propagated in the fiber, let us consider any two nearby modes k and l, denoted as ($k^+$, $l^+$) and ($k^-$, $l^-$), respectively, for each direction of mode propagation within the fiber.

Because there is independence between modes, combinations of modes may be either coherent or incoherent. For example, modes may result from coupling between two direct modes ($k^+$, $k^-$) and coupled modes ($lk^+$, $lk^-$) resulting from nearby mode l which is coupled in mode k. The different possible combinations at the level of mode k are detailed as follows:

combination between direct modes:
  the combination of modes ($k^+$, $k^-$) gives a reciprocal interference signal, that is, one which contains no term of disturbance;

combination between direct modes and coupled modes:
  the combinations ($k^+$, $lk^+$) and ($k^-$, $lk^-$) correspond to combinations between co-propagating and incoherent modes, as they originate from two initially independent, superimposed modes k and l. Thus, these combinations do not produce any interference and they contribute only to the incoherent optical signal.

the combinations ($k^+$, $lk^-$) and ($k^-$, $lk^+$) correspond to combinations between modes which are counter-propagating but incoherent, since they originate from two independent modes. As described above, they produce no interference and they contribute only to the continuous optical signal.

combination between coupled modes:
  the combination ($lk^+$, $lk^-$) corresponds to a combination between counter-propagating modes originating from the initially incoherent modes $l^+$ and $l^-$. Nevertheless, modes ($lk^+$, $lk^-$) travel different optical paths in the fiber, which generally ensures their independence, except in one particular case, which will now be examined.

It is important to consider the case of modes originating from couplings due to stationary, localized, symmetrical disturbances along the coil, for example at $Z^+$ and $Z^-$, as shown schematically in FIG. 1. The combinations among modes created respectively at $Z^+$ and $Z^-$, i.e. ($lk^+(Z^+)$, $lk^-(Z^-)$) and ($lk^-(Z^+)$, $lk^+(Z^-)$) remain coherent to the extent they travel essentially the same optical paths in the fiber. The disturbances are not necessarily identical and thus they produce dephasing, which causes the appearance of non-reciprocal terms and in turn produces instability in gyroscope response.

This demonstration makes reference to a given mode of propagation k. It will now be extended to all the possible modes along the total length of the fiber.

The resulting output signal appears as the sum of two components:
  a first incoherent, continuous component originating from couplings between two incoherent modes; and
  a second coherent component which consists of the sum of the signals originating from the combinations between direct, similar modes with Sagnac phase terms, and of signals originating from combinations between coupled modes with simultaneous Sagnac phase terms and instability terms.

It is desirable to decrease the influence of instability terms. One solution would consist of using a highly multi-modal fiber. In practice, the higher the possible number of modes within a fiber, the higher the number of possible combinations between modes, and the greater the tendency of the average value of random instability signals to approach zero, thus rendering the gyroscope intrinsically stable. However, this solution has one drawback. An increase in the number of modes within the fiber is accompanied by an increase in the incoherent, continuous component of the signal and thus of the phototonic noise it generates. This results in degradation of the signal/noise ratio and thus in signal resolution. Calculations show that this is inversely proportionate to the total number of possible modes in the fiber.

Thus, a compromise is sought between stability and signal resolution, that is, maximum intermodal dispersion with a simultaneous limit on the total number of modes in the fiber.

Calculations prove that all the terms originating from the coupled modes contribute to the global signal in the ratio of $L_{cf}/L$, where $L_{cf}$ is the length of coherence in the fiber and L is its total length.

Thus, the total number of modes in the fiber can be limited without harming signal stability if, at the same time, the contribution of instability terms of said signal is limited by minimizing the relationship $L_{cf}/L$. This can be achieved either by increasing the total length L of the optical fiber or by decreasing the length of coherence $L_{cf}$ in the fiber. The length of coherence $L_{cf}$ in the fiber is proportionate to the difference in propagation times in the mode groups of the order k and l denoted as $\Delta\tau_{l,k}$ with $$\Delta\tau_{l,k} = \frac{nL_{cf}}{c}\Delta\left(\frac{2-2p-a}{a+2}\right)\left[\left(\frac{l}{m}\right)^{\frac{2a}{a+2}} - \left(\frac{k}{m}\right)^{\frac{2a}{a+2}}\right]$$

where:
  n is the index of the fiber core,
  c is the speed of light.
  Δ is the relative difference of the core and the clad indexes,
  p is the chromatic dispersion parameter of the fiber,
  α is the profile of the fiber index, and
  M is the total number of groups of modes.

The proportion of coherent energy generated by couplings between modes k and l is such that the difference in the optical path between these two groups of modes is at least equal to the length of coherence of the source:

$$\frac{L_{cf}}{L} = \frac{L_{cs}}{L \cdot ON^2}\left(\frac{a+2}{2-2p-a}\right)\frac{1}{\left[\left(\frac{l}{M}\right)^{\frac{2a}{a+2}} - \left(\frac{k}{M}\right)^{\frac{2a}{a+2}}\right]}$$

where:
  $L_{cs}$ is the length of coherence of the source,
  L is the total length of the fiber, and
  ON is the numerical aperture of the fiber.

It follows from the preceding formula that the various parameters which can be manipulated to achieve the desired compromise between stability and resolution are as follows: index profile, central source wave length, spectral width of source, chromatic dispersion parameter of fiber, numerical aperture, fiber radius, core, and length.

Figure 2:
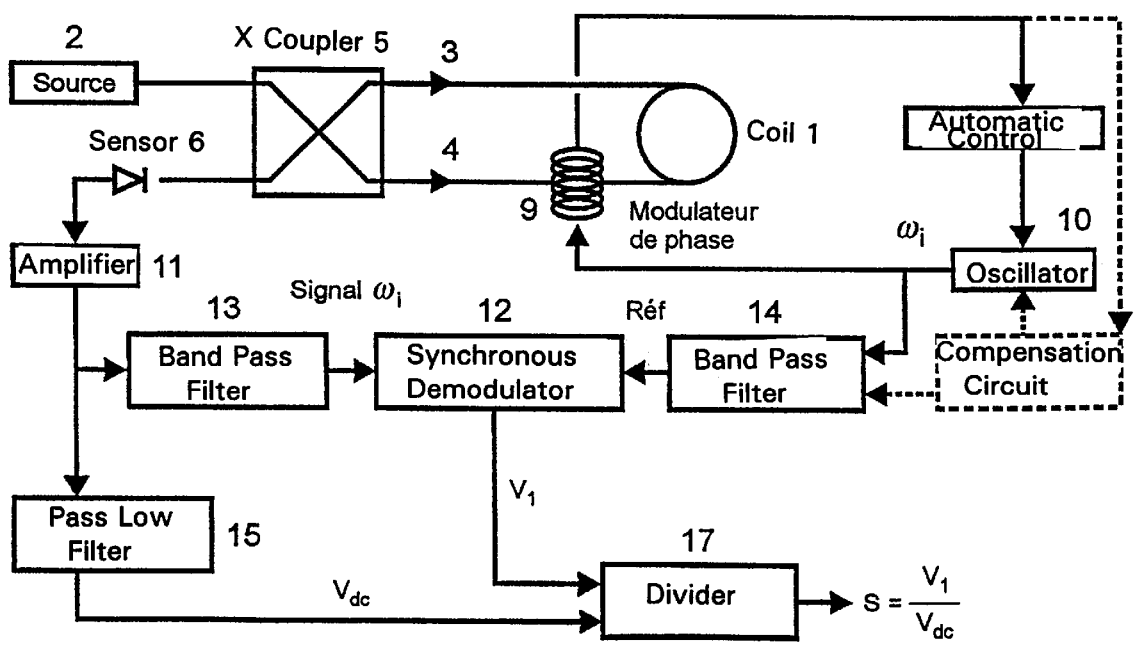
FIG. 2 is a schematic representation with functional blocks of a gyroscope according to the invention in the case of a first formula for processing the output signal.

The gyroscope shown schematically in its entirety in FIG. 2 comprises a ring guide or coil 1 consisting of coiled optical fiber of variable length depending upon the sensitivity sought, practically speaking, ranging from several meters to several hundreds of meters in length. According to the invention, the optical fiber must be a multimode fiber with an index profile allowing a high degree of intermodal dispersion. A preferred example of such a fiber is a multimode high index fiber.

Figure 3:
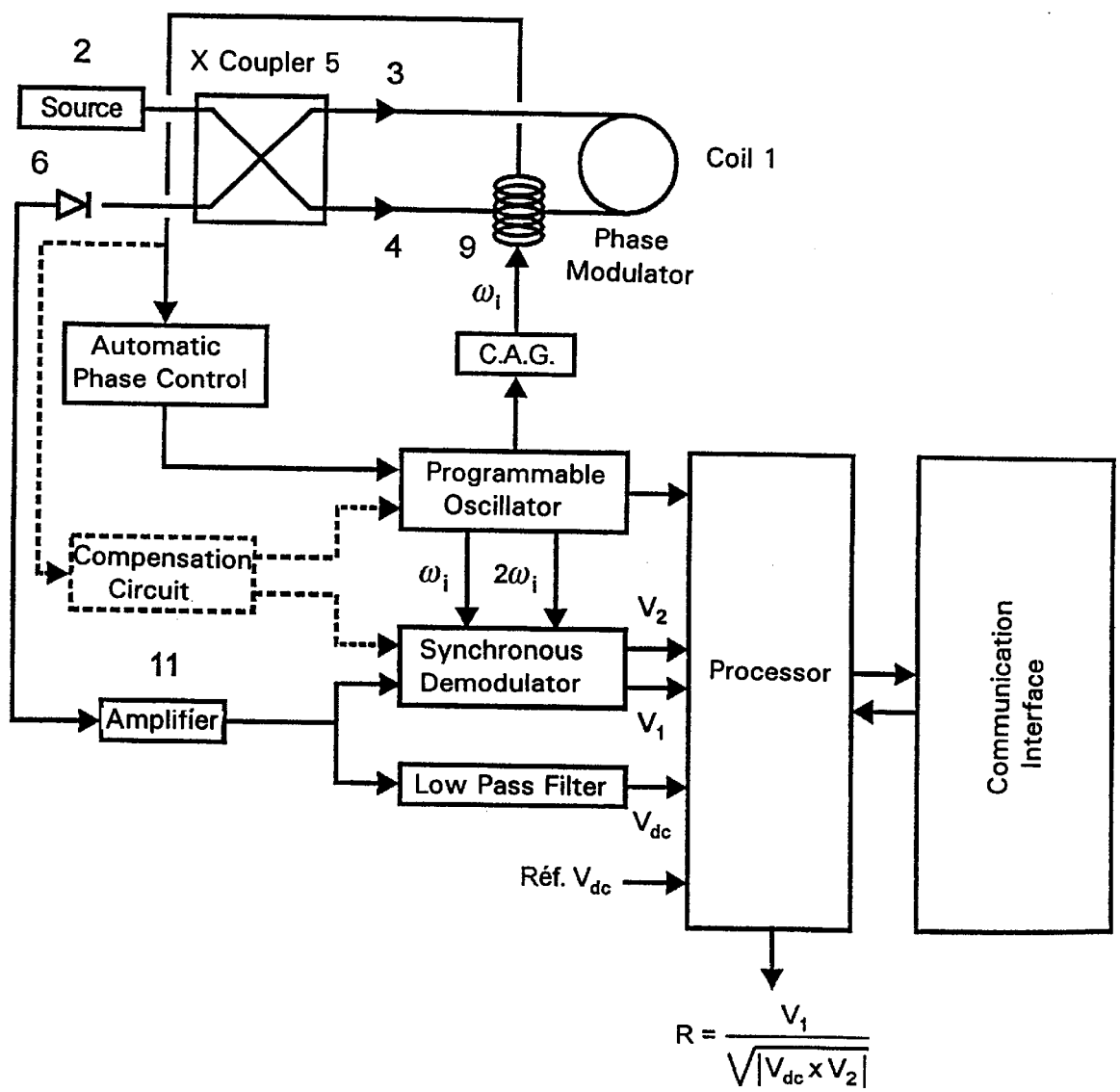
FIG. 3 is a schematic representation in functional blocks of a gyroscope according to the invention in the case of a second formula for processing the output signal.

As shown in FIGS. 2 and 3, a source 2 of slightly coherent light with a broad spectrum, preferably a light-emitting diode, supplies the two inlets 3 and 4 of the coil 1 of optical fiber through a single X coupler 5. This single coupler, which is also multimodal, symmetrically divides the modes in both directions, that is, it separates the wave emitted by light source 2 into two symmetrical, counter-propagating modal distributions.

X coupler 5 also collects waves which have passed through coil 1 in mutually inverse directions and directs them towards an interference detector 6, preferably a photodiode located on the output pathway of the gyroscope.

Figure 4:
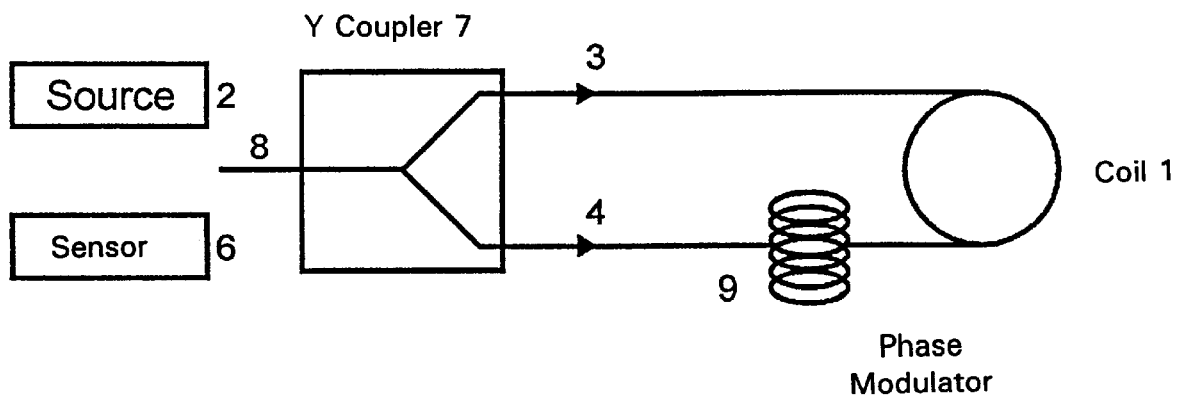
FIG. 4 is a partial schematic representation of a variation of the gyroscope with a single Y coupler.

According to a variation of the execution of the invention shown in FIG. 4, the ends of coil 1 are coupled to the unit consisting of the light source 2 and interference detector 6 by means of a single Y coupler 7. In this case source 2 and detector 6 are located at the same level on the input branch 8 of coupler 7. Two operational modes are possible. In a first operational mode, light source 2 and interference detector 6 alternate periodically. In a second operational mode, light source 2 and interference detector 6 work continuously and simultaneously.

The various optical elements of the gyroscope of the invention that are preferably based on diffractive optical components have been examined. Next, the operating electronic circuits associated with them will be examined.

Phase modulating elements such as optical signal modulator 9, known simply as modulator 9, are asymmetrically arranged at one of the inlets 3 or 4 of the multimode optical fiber coil 1, in such a way that the entire length of optical fiber serves as a delay line, with the co-rotating wave immediately reaching modulator 9, while the counter-rotating wave must first pass through the entire length of coil 1 before reaching it.

There are other possible variations in execution for phase modulator 9, which are not shown.

A first, known variation uses a tube of piezoelectric material surrounded by a length of multimode optical fiber.

A second variation uses a portion of multimode fiber with the exterior coated with piezoelectric material. This solution is advantageous in limiting the space required for phase modulating elements 9.

Another variation concerns a multimode fiber inserted in a flexible piezoelectric capillary.

Yet another variation concerns a fiber with a periodic modulation of its core index along a portion of its length, which is obtained by photoengraving or chemical treatment. The benefit of this variation is that it allows phase modulation of the counter-rotating light waves directly at the fiber core, eliminating the need for conventional modulation from the device. For this reason it offers significant advantages in terms of cost and space.

The installation has a sinusoidal modulation oscillator 10 furnishing reference $\omega_i$ used to supply a suitable modulation signal $\omega_i$ to modulator 9.

The detection circuit per se comprises, first, an amplifier 11 located after interference detector 6 which drives a synchronous demodulator 12. Modulation signal $\omega_i$ delivered by sinusoidal modulation oscillator 10 and exciting phase modulator 9 also serves as a reference signal for the synchronous demodulator 12.

In order to neutralize fluctuations associated with phase modulator 9, a loop is used to control the phase and the amplitude of the modulated signal in relation to the modulation signal, which simultaneously serves as the reference signal for synchronous demodulator 12.

The characteristic fluctuations in modulator 9 can also be overcome through the use of a suitable compensation circuit (shown by dashed lines) acting on local oscillator 10 and the synchronous demodulator through a modulator detector, located, for example, either inside or next to modulator 9.

According to a preferred embodiment, two band pass filters 13 and 14 are respectively provided, first, between amplifier 11 and synchronous demodulator 12, and second, between demodulator 12 and sinusoidal modulation oscillator 10. The purpose of these filters 13 and 14 is especially to eliminate any non-linearity in frequency of phase modulator 9. In practice, even when phase modulator 9 is excited with a single frequency, it may begin to oscillate at modes corresponding to frequencies other than the frequency of modulation. Therefore, it is preferable to use band pass filters centered on the frequency of modulation signal $\omega_i$ from modulator 9 to eliminate such non-linear phenomena.

At the output of amplifier 11, there is a low pass filter 15 with low frequency cut-off to isolate the continuous incoherent component $V_{dc}$ of the optical signal.

Figure 5:
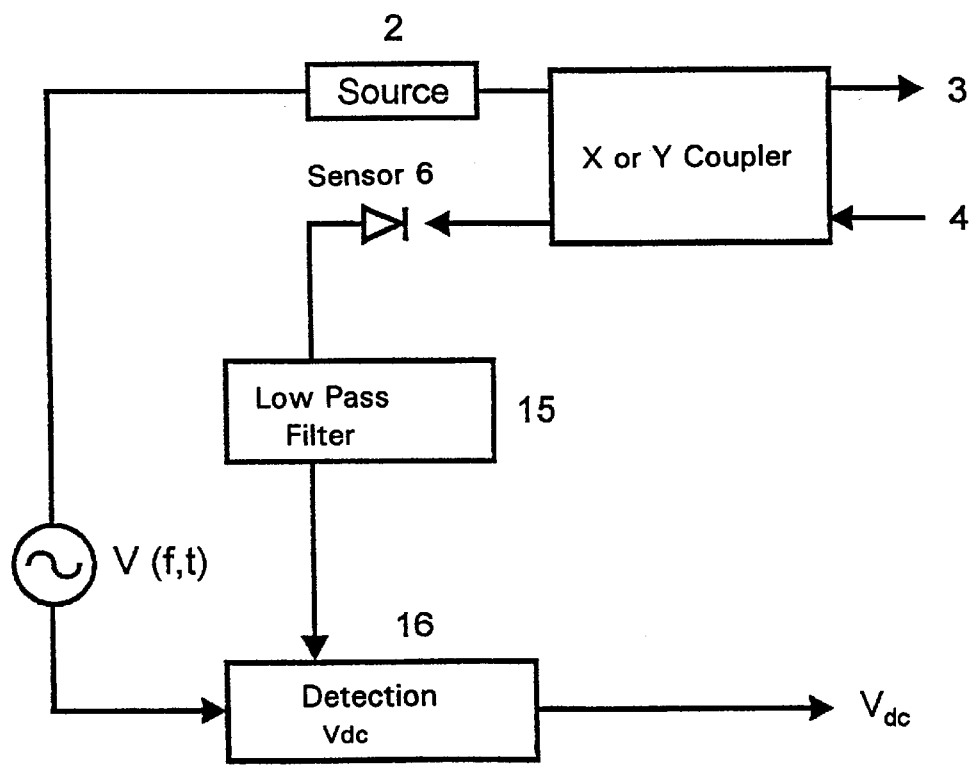
FIG. 5 is a partial schematic representation of the gyroscope of FIG. 1 with amplitude modulation of the light source.

A much more precise solution than the simple low pass filtration of continuous incoherent component $V_{dc}$ of the optical signal is shown in FIG. 5. It consists of modulating light source 2 in amplitude by using periodic modulation voltage delivered by a generator V(f, t) at a modulation frequency f considerably lower than modulation frequency $\omega_i$ of the signal exciting phase modulator 9. A detection unit 16 in the form of a dual rectangular synchronous demodulator then detects the continuous incoherent component $V_{dc}$ of the optical signal. This solution offers the advantage of detecting very slight variations in the continuous incoherent component $V_{dc}$ of the optic signal.

The assemblage of FIG. 2 terminates in a divider module 17 receiving a voltage $V_1$ originating from the synchronous demodulator, corresponding to a proportionality factor close to the amplitude of the component of the $1^{st}$ order harmonic (the fundamental) of the optical signal and voltage $V_{dc}$ corresponding to the continuous incoherent component of the optical signal. The role of the divider module is to effect the arithmetic relationship $$S=V_1/V_{dc}$$

representing at a constant multiplication factor the scaling factor of the gyroscope, that is, the positive or negative algebraic value used to determine rotation speed i.e., the speed of angular displacement of the gyroscope and thus of the support to which it is attached, which is displaced along with it and pivots about a reference axis in space. This relationship in values is used to compensate for the majority of variations and fluctuations in intensity associated with instability of the optical source, losses in the fiber, the optical detector and other components, resulting in the elimination of most of the fluctuations connected with fluctuations in the scaling factor of the gyroscope.

There remains, however, the fluctuation linked with the fluctuation in wavelength of the source wave, which tends to remain at a minimum when using the assembly and quotient method shown in FIG. 2.

Another assembly shown in FIG. 3 corresponds to another quotient. Again, the $2^{nd}$ order harmonic is used here. This quotient, indicated below, eliminates different fluctuations, but especially those caused from wavelength variations in the source wave.

According to this variation, values $V_1$ and $V_2$ are detected and used in proportion to the amplitudes of the continuous coherent components originating from synchronous demodulation of the $1^{st}$ and $2^{nd}$ order harmonics of the optic signal. These voltage values are found at the output of the synchronous demodulators associated with each $1^{st}$ and $2^{nd}$ order harmonic.

The assembly shown in FIG. 3 is similar to that of FIG. 2. It comprises the same general functions.

There is, for example, an oscillator that can be programmed to generate the excitation signal for modulator 9 at frequency $\omega_i$ through block CAG which automatically controls the increase. The oscillator is equipped with two signal outputs at frequencies $\omega_i$ and $2\omega_i$ toward the two synchronous demodulators respectively set at frequencies of $\omega_i$ and $2\omega_i$, that is, at the modulation fundamental and its $2^{nd}$ order harmonic. Thus, at the output of the synchronous demodulators, signals $V_1$ and $V_2$ are obtained, corresponding to the amplitudes of the continuous coherent components of the fundamental and of the $2^{nd}$ order harmonic of the optical signal. The assembly is completed by a band pass filter whose role is to isolate $V_{dc}$ which, as previously indicated, is the continuous incoherent component of the optical signal. These values enter a processor externally connected by a communications interface. The interface is also connected to the processor and at one input, it receives a reference voltage Ref. $V_{dc}$ for the value of $V_{dc}$.

This assembly also comprises an automatic control circuit to stabilize modulator 9 or a compensation module similar to that of the assembly shown in FIG. 2.

According to the invention, the processor establishes the following mathematical relationship between values $V_1$, $V_2$ and $V_{dc}$:

$$R = \frac{V_1}{\sqrt{|V_2 \times V_{dc}|}}$$

where $V_1$=the amplitude of the fundamental harmonic of the optical signal, $V_2$=the amplitude of the $2^{nd}$ order harmonic component of the optical signal, and $V_{dc}$=the continuous incoherent component of the optical signal.

As before, the result of this operation, referenced as R, is a value representing the speed of angular displacement at which the gyroscope pivots around the supporting axle to which it is attached.

This operation can be performed as either an analog or a digital operation so the result can be used as an indication of the support position in relation to the pivot axle and in space in relation to a referential if three gyroscopes are used.

Until now, the description has concerned the structure of a gyroscope according to the invention with a single axis of rotation, that is, a single coil.

Figure 6:
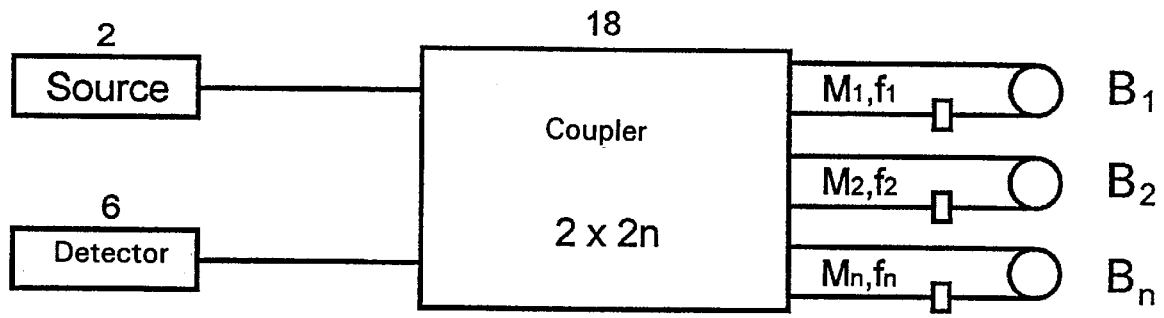
FIG. 6 is a schematic representation of the principle of a multi-axial gyroscope.

According to a variation shown schematically in FIG. 6, the gyroscope according to the invention may comprise n axes, for example, three axes, one for each direction in space.

In this case, the gyroscope comprises as many reference coils $B_1$ through $B_n$ as there are corresponding axes 1 through n, coils $B_1$ through $B_n$ being connected to the unit consisting of light source 2 and interference detector 6 by means of a star connector 18 with 2×2n access points.

Figure 7:
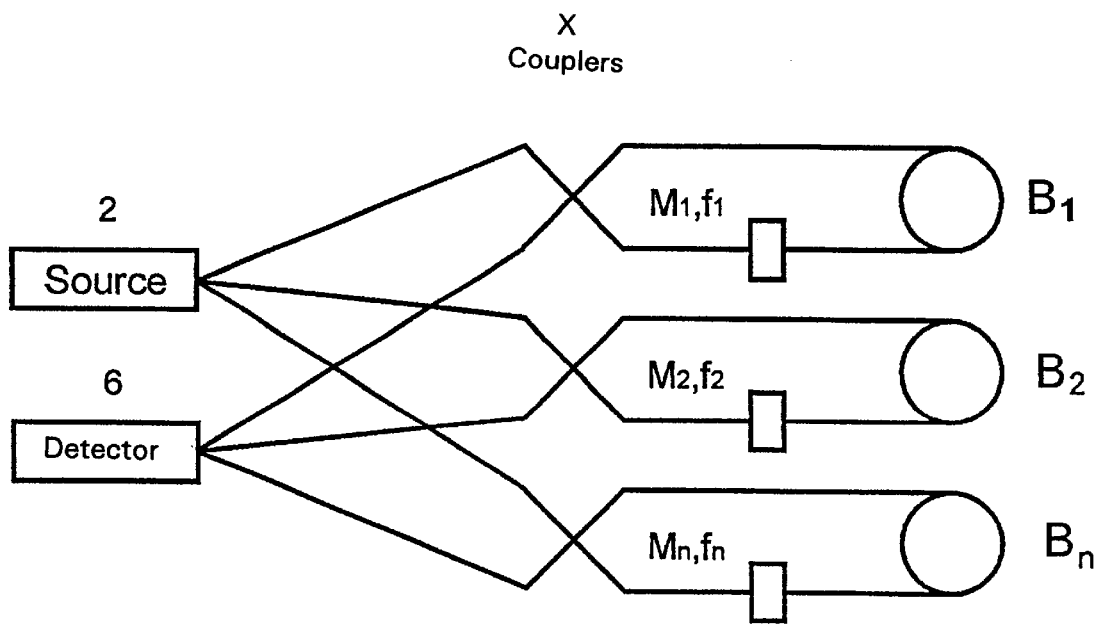
FIG. 7 is a schematic representation of a simplified version of a multi-axial gyroscope.

Star connector 18 with 2×2n access points between source 2, coils $B_1$ through $B_n$, and detector 6 is optional, since the emission surface of the source is large enough in relation to the diameter of the core of the fiber that the same amount of energy is injected in several fibers as if it were a single fiber. Thus, it is possible to treat a large number of circuits containing one coil as if they were so many individual circuits requiring only one X coupler per circuit, as shown in FIG. 7. Thus, all the structures of the complex, multiple star connector are gained.

Figure 8:
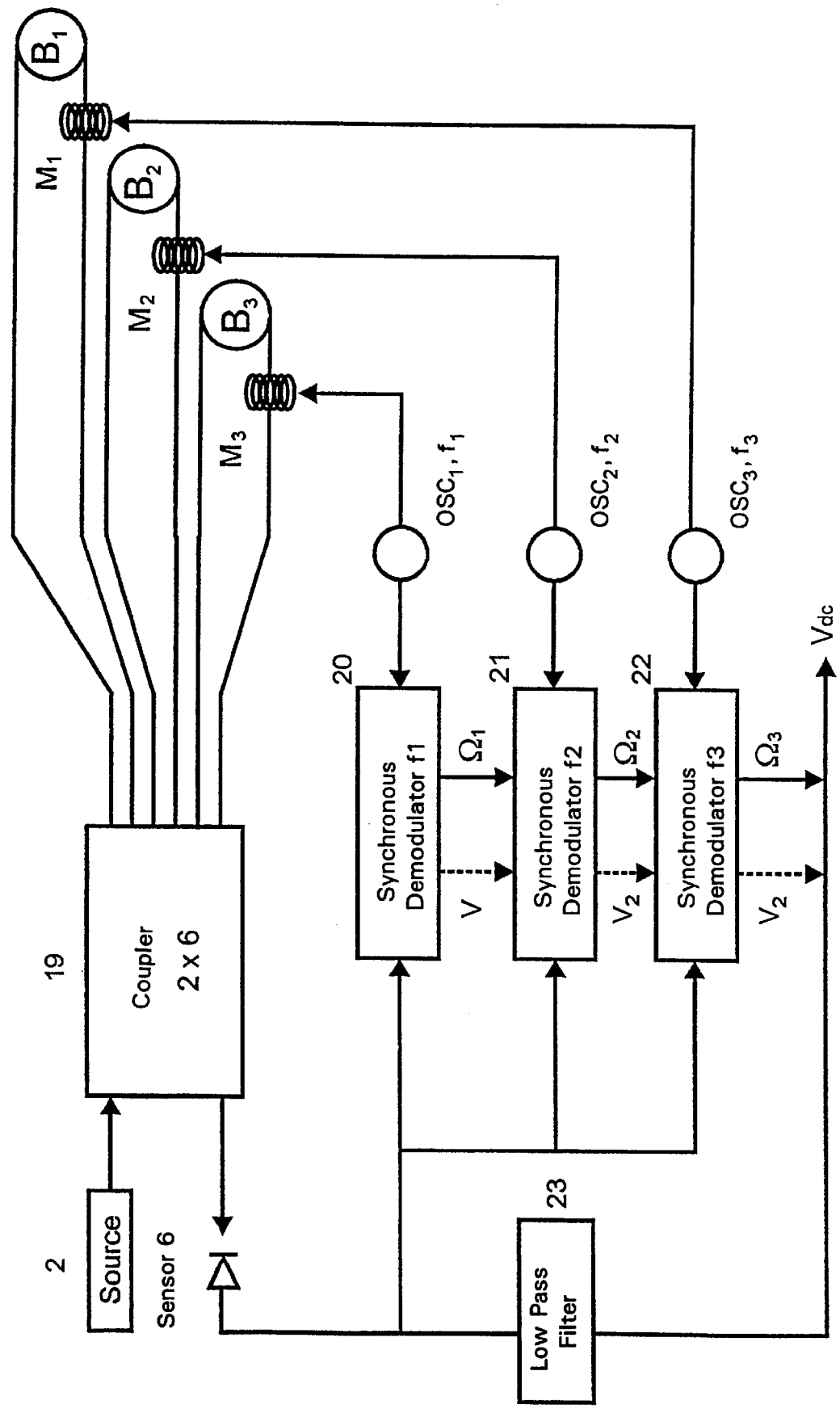
FIG. 8 is a schematic representation of a gyroscope with three axes and three oscillators.

As in the case of the single-axis gyroscope, phase modulation means $M_1$ through $M_n$, respectively, each modulated by an excitation signal $f_1$ through $f_n$, respectively, are asymmetrically attached to one of the inputs of each coil $B_1$ through $B_n$ (FIG. 8).

Next, a gyroscope with three axes—for example, one axis for each direction in space—will be examined.

Two different embodiments are envisioned.

According to the first of these, shown in FIG. 8, the inlets of the three coils are supplied by light source 2 using a star coupler 19 with 2×6 access points. Three sinusoidal oscillators denoted at $OSC_1$, $OSC_2$, and $OSC_3$ supply respective references $f_1$, $f_2$ and $f_3$ used to modulate the excitation signals of three phase modulators $M_1$, $M_2$ and $M_3$ asymmetrically attached to one of the inputs of each of the three gyroscope coils. Signals $f_1$, $f_2$ and $f_3$ delivered by oscillators $OSC_1$, $OSC_2$, and $OSC_3$ also serve as a reference for three synchronous demodulators 20, 21 and 22 bypassing the output of interference detector 6. As with the single axis gyroscope, the detection circuit is completed by a low pass filter 23 used for selection of the continuous incoherent component $V_{dc}$ of the optical signal. Finally, each synchronous demodulator 20, 21 and 22 or double synchronous demodulator delivers one or two output voltages $V_1$, $V_2$ and $V_3$ in the case of the two variations corresponding to two quotients, above, and which furnish data about the Sagnac phase for each of the three axes, that is, each of the three gyroscope coils.

Figure 9:
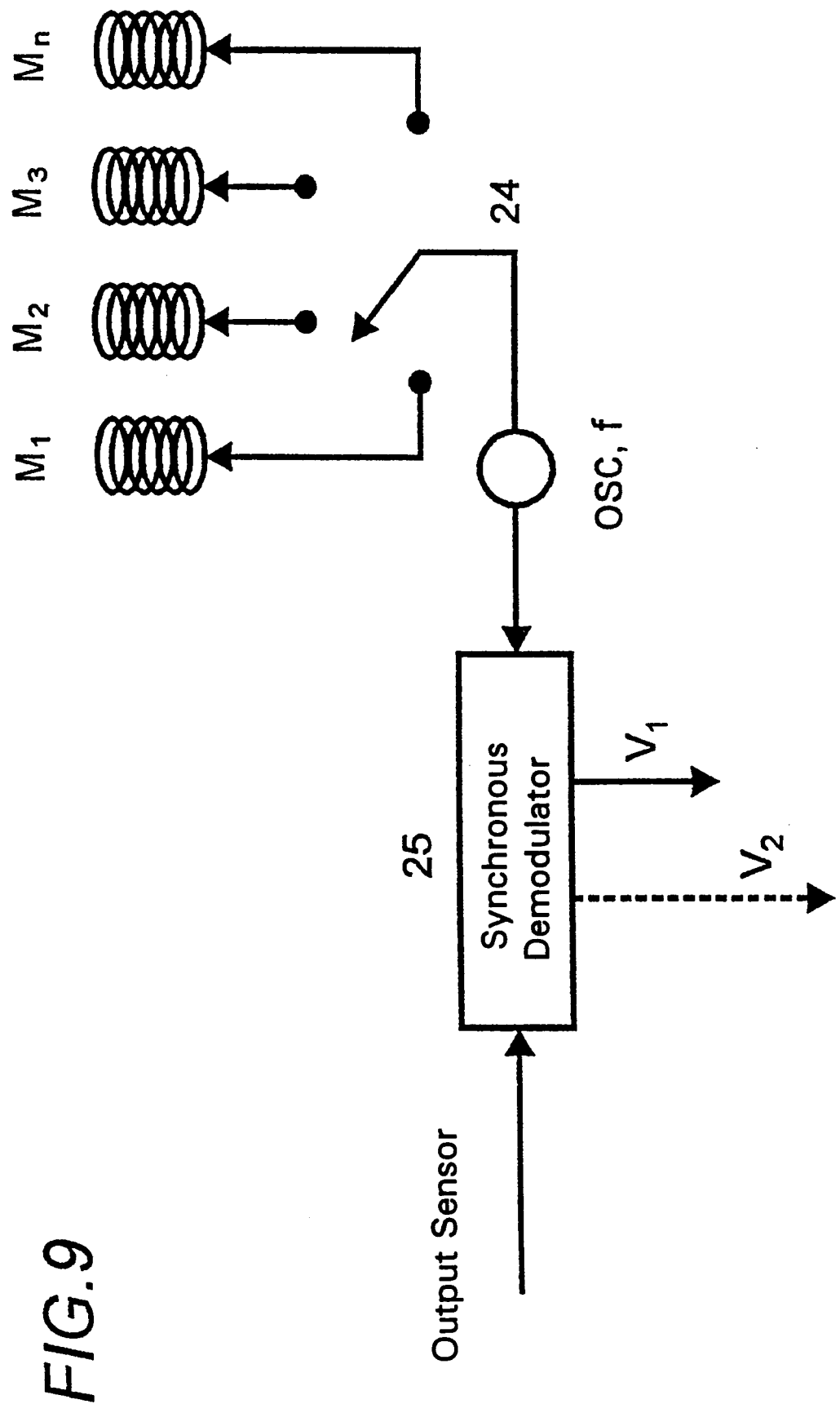
FIG. 9 is a schematic representation of a variation of the multi-axial gyroscope with switching phase modulators.

According to the second possible embodiment shown in FIG. 9, a single sinusoidal oscillator OSC furnishing a reference f is connected with a switch 24 to each of the three phase modulators $M_1$, $M_2$ and $M_3$. Thus, modulation is accomplished in split time and the Sagnac data is obtained sequentially for each coil with a single synchronous demodulator 25.

Certainly in the case of a three axis gyroscope, all the variations and options applicable to the single axis assembly remain valid and applicable. The same is also true in the automatic control or compensation module.

What is claimed is:

1. A multimode optical fiber gyroscope comprising:
   a SAGNAC interferometer having an optical fiber coil comprising a length of multimode optical fiber having a first end and a second end;
   a symmetrical multimode X-coupler coupled to the first end and the second end of the multimode optical fiber;
   a light source supplying light through the a symmetrical multimode X-coupler into the first end and the second end of the multimode optical fiber coil, the multimode optical fiber coil having an intermodal dispersion such that adjacent optical paths have a difference between co-propagating adjacent modes of any order of the supplied light that is greater than a coherence length of the light source, and a limited number of modes;

an optical detector, coupled to the symmetrical multimode X-coupler, for receiving a multimode optical signal from the first and second ends of the optical fiber via the symmetrical multimode X-coupler, the multimode optical signal being generated by a first and second counter rotating multimode optical signals emitted from the first and second ends of the multimode optical fiber;

the optical detector receiving the multimode optical signal which is converted to an initial electrical signal, amplified and assigned a first voltage value $V_1$ proportional to the amplitude of the first order harmonic of the multimode optical signal, a second voltage value $V_2$ is assigned proportional to the second order harmonic of the multimode optical signal and a third voltage value $V_{dc}$ is assigned proportional to the continuous incoherent component of the multimode optical signal;

a processor for determining a result R based upon a mathematical relationship between assigned voltage values $V_1$, $V_2$ and $V_{dc}$ to compensate for fluctuations in the multimode optical signal caused by intensity and wavelength instabilities in the light source, variability in the X-coupler, the multimode optical fiber and the optical detector; and wherein the result R is determined for all the modes of the multimode optical signal and a statistical average result is obtained.

2. A multimode optical fiber gyroscope according to claim 1, wherein the result R is determined by the processor based on the mathematical relationship:

$$R = \frac{V_1}{\sqrt{|V_2 \cdot V_{dc}|}}$$

and a control loop provides a reference electrical signal for comparison with the initial electrical signal.

3. The gyroscope according to claim 1, wherein the multimode optical fiber has a step index profile.

4. The gyroscope according to claim 1, wherein the light source (2) is a light-emitting diode.

5. The gyroscope according to claim 1, wherein the voltages $V_1$ and $V_2$, proportional to the amplitudes of the $1^{st}$ and $2^{nd}$ harmonics of the optical signal are detected by a synchronous demodulator.

6. The gyroscope according to claim 5, wherein an amplifier and a low pass filter are sequentially arranged at an output of the optical detector (6) for isolating the voltage $V_{dc}$ proportional to the continuous incoherent component of the fiber optic signal.

7. The gyroscope according to claim 6, wherein a divider module establishes a scaling factor S based on the $1^{st}$ order harmonic after synchronous demodulation and the voltage $V_{dc}$ proportional to the continuous incoherent component of the fiber optic signal according to the algebraic relationship:

$$S = V_1/V_{dc}.$$

8. The gyroscope according to claim 5, wherein the gyroscope further comprises a phase modulator (9) asymmetrically disposed on one of the first and second ends of the fiber optic coil (1) and a sinusoidal oscillator (10) furnishes a reference value ($\omega_i$) used to modulate any signal fluctuation of the phase modulator (9).

9. The gyroscope according to claim 8, wherein the phase modulator (9) is a tube of piezoelectric material surrounded by a length of multimode optical fiber.

10. The gyroscope according to claim 8, wherein the phase modulator (9) is a portion of multimode optical fiber with an exterior coating of piezoelectric material.

11. The gyroscope according to claim 8, wherein the phase modulator (9) is a multimode fiber inserted in a flexible piezoelectric capillary.

12. The gyroscope according to claim 8, wherein the phase modulator (9) is a periodic marking on a portion of fiber obtained by one of photogravure and chemical treatment.

13. The gyroscope according to claim 8, wherein the modulation signal ($\omega_i$) is applied as a reference signal to the synchronous demodulator.

14. The gyroscope according to claim 8, wherein the light source (2) is modulated in amplitude at a modulation frequency f which is lower than a modulation frequency of the phase modulator (9), and a rectangular double synchronous demodulator detects the continuous incoherent component $V_{dc}$ of the optical signal.

15. The gyroscope according to claim 1, wherein the gyroscope comprises a single X coupler (5) which separates a wave emitted by the light source (2) into two symmetrical counter-rotating modal distributions.

16. The gyroscope according to claim 15, wherein the X coupler is based upon interference filter properties.

17. The gyroscope according to claim 15, wherein the X coupler is made from a diffractive plane, optical component.

18. The gyroscope according to claim 1, wherein the optical detector comprises a detection circuit having a synchronous demodulator (12) generating $V_1$ and a low pass filter (15) which selects the continuous incoherent component $V_{dc}$ of the optical signal.

19. The gyroscope according to claim 18, wherein a divider (17) receives the $V_{dc}$ signal from the low pass filter (15) and the $V_1$ signal from the synchronous demodulator (12) to establish a scaling factor S from the algebraic relationship: $S = V_1/V_{dc}$.

20. The gyroscope according to claim 1, wherein the gyroscope functions at two different central wave lengths.

21. The gyroscope according to claim 1, wherein in order to stabilize a global signal of the gyroscope, a ratio $L_{cf}/L$ is decreased, where $L_{cf}$ is the length of coherence in the optical fiber and L is the total length of the optical fiber.

22. A multimode optical fiber gyroscope comprising:

a light source (2);

an optical fiber ring guide comprised of multimode optical fiber;

a coupler;

a ring-shaped Sagnac interferometer attached in a non-reciprocal configuration with the light source (2) which supplies light to two opposed extremities of the optical fiber ring guide via the coupler;

an optical detector (6) for receiving two counterpropagative modal distributions of the light once the light traverses the optical fiber ring guide in mutually inverse directions;

the light is supplied through a single multimodal and modally symmetrical coupler in both directions;

the multimode optical fiber is an intermodal dispersion fiber such that an optical path difference between two nearby co-propagating modes of any order is much greater than a length of coherence of the light source (2) and a limited number of possible propagation modes;

the optical detector furnishes a voltage with a value $V_1$ proportional to the amplitude of a first order harmonic to which is added a value $V_2$ proportional to the amplitude of the $2^{nd}$ order harmonic of the output signal of the optical detector (6) called the optical signal, and a value $V_{dc}$ proportional to the incoherent DC component of the optical signal obtained after amplification of the optical signal;

a processor for establishing a mathematical relationship R between the values $V_1$, $V_2$, $V_{dc}$, respectively, of the $0^{th}$, $1^{st}$ and $2^{nd}$ order harmonics to eliminate fluctuations in components of the gyroscope; wherein $$R = \frac{V_1}{\sqrt{|V_2 \cdot V_{dc}|}}$$

and the modes and their combinations are averaged.

23. The gyroscope according to claim 22, wherein the coupler comprises a single Y coupler (7).

24. The gyroscope according to claim 23, wherein the Y coupler is based upon interference filter properties.

25. The gyroscope according to claim 23, wherein the Y coupler is made from a diffractive plane, optical component.

26. The gyroscope according to claim 22, wherein the gyroscope comprises a plurality of optical fiber ring guides ($B_1, \ldots, B_n$) and the coupler is a star coupler (18) with $2 \times 2n$ access points.

27. The gyroscope according to claim 26, wherein the light source (2) and the detector (6) are each individually connected, through a single individual X coupler, to each of the plurality of optical fiber ring guides ($B_1, \ldots, B_n$).

28. The gyroscope according to claim 26, wherein the gyroscope comprises a single synchronous demodulator (25) and a single sinusoidal oscillator (OSC) connected to the plurality of optical fiber ring guides ($B_1, B_2, B_3$) by a switch (24).

29. A multimode optical fiber gyroscope comprising:
   a SAGNAC interferometer having an optical fiber coil comprising a length of multimode optical fiber having a first end and a second end;
   a symmetrical multimode X-coupler coupled to the first end and the second end of the multimode optical fiber;
   a light source non-reciprocally supplying light through the symmetrical multimode X-coupler into the first end and the second end of the multimode optical fiber, the multimode optical fiber having an intermodal dispersion such that adjacent optical paths have a difference between co-propagating adjacent modes of any order of the supplied light that is greater than a coherence length of the light source, and a limited number of modes;
   an optical detector, coupled to the symmetrical multimode X-coupler, for receiving a multimode optical signal from the first and second ends of the optical fiber via the symmetrical multimode X-coupler, the multimode optical signal being generated by a first and second counter rotating multimode optical signals emitted from the first and second ends of the multimode optical fiber;
   the optical detector receiving the multimode optical signal which is converted to an initial electrical signal, amplified and assigned a first voltage value $V_1$ proportional to the amplitude of the first order harmonic of the multimode optical signal, a second voltage value $V_2$ is assigned proportional to the second order harmonic of the multimode optical signal and a third voltage value $V_{dc}$ is assigned proportional to the continuous incoherent component of the multimode optical signal;
   a processor for determining a result R based upon a mathematical relationship between assigned voltage values $V_1$, $V_2$ and $V_{dc}$ to compensate for fluctuations in the multimode optical signal caused by instability in the light source, variability in the X-coupler, the multimode optical fiber and the optical detector;
   wherein the result R is determined for each mode of the multimode optical signal by the processor based on the mathematical relationship:

$$R = \frac{V_1}{\sqrt{|V_2 \cdot V_{dc}|}}$$

a statistical average result is obtained; and
   a control loop provides a reference electrical signal for comparison with the initial electrical signal.

* * * * *